No. 697,554. Patented Apr. 15, 1902.
H. SEILER.
APPARATUS FOR HEATING OR COOLING LIQUIDS.
(Application filed Apr. 24, 1900.)
(No Model.)
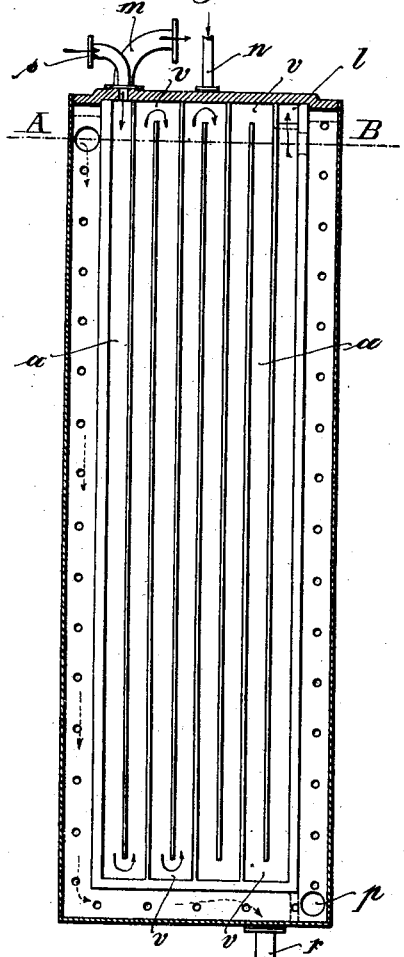
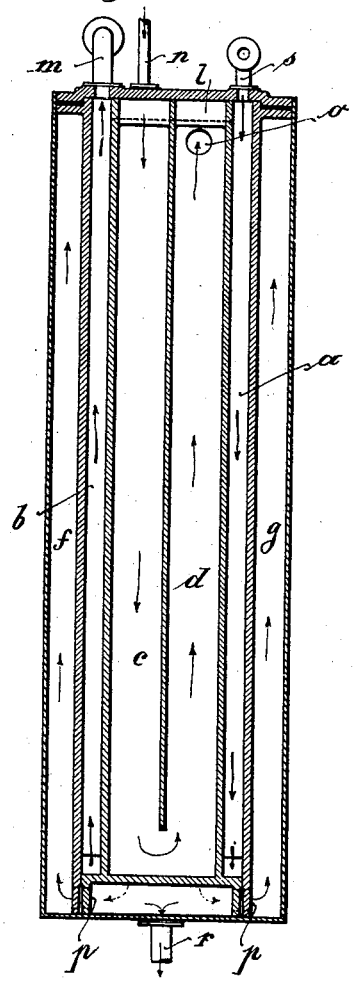
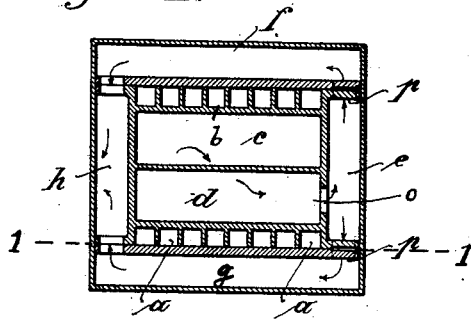
Witnesses:
Edward Ray
William Schulz
Inventor:
Hubert Seiler
by his attorneys
Roeder & Briesen

UNITED STATES PATENT OFFICE.

HUBERT SEILER, OF DUSSELDORF, GERMANY.

APPARATUS FOR HEATING OR COOLING LIQUIDS.

SPECIFICATION forming part of Letters Patent No. 697,554, dated April 15, 1902.

Application filed April 24, 1900. Serial No. 14,087. (No model.)

*To all whom it may concern:*

Be it known that I, HUBERT SEILER, mechanical engineer, a citizen of Germany, and a resident of Dusseldorf, Germany, have invented certain new and useful Improvements in Apparatus for Heating or Cooling Liquids, of which the following is a specification.

This invention has for its object to construct a heating or cooling apparatus for liquids which combines efficiency with simplicity of construction and facility of manufacture and which is specially suitable as a feed-water heater.

In the accompanying drawings, Figure 1 is a vertical section of an apparatus embodying my invention on line 1 1, Fig. 3. Fig. 2 is a vertical section at right angles to Fig. 1, and Fig. 3 is a horizontal section along line A B of Fig. 1.

The apparatus chiefly comprises an upright hollow body provided with parallel channels $a$ and $b$, which receive the liquid to be heated or cooled. These channels communicate with one another through passages $v$ alternately at the top and at the bottom, so as to conduct the liquid forward and backward in a sinuous course. The interior of the hollow body serves as heating-chamber.

In the example represented by the drawings two compartments $c$ and $d$ have been provided, which communicate at the bottom and which are surrounded by additional compartments $e$, $f$, $g$, and $h$, adapted to conduct the heating or cooling medium—for instance, steam—one after the other, also in a sinuous course. In the example shown the water enters through the inlet-pipe $s$, then flows through the channels $a$ and passes through the short pipe $l$ into the channels $b$. After having passed through all of these it leaves the apparatus through the short pipe $m$ to the exterior. The steam enters through inlet-pipe $n$, upper end of chamber $c$, then flows into chamber $d$, then passes through upper channel $o$ into the chamber $e$, thence through the lower channels $p$ to the compartments $f$ and $g$, and finally through the channel $h$ to the outlet $r$. The uncondensed steam, together with the air contained in the steam, escapes through the pipe $r$.

Owing to the length of the way which the liquid to be heated or cooled must take in passing through the channels $a$ and $b$, on which way it is constantly exposed to the influence of the steam or other heating or cooling medium, the heating or cooling efficiency of the apparatus is very high. The number of external heating or cooling compartments may be reduced or increased. The apparatus may have a rectangular or other suitable cross-section and is provided at the bottom with discharge-openings or draw-off devices for the water of condensation.

Instead of having an upright position, as shown by the drawings, the apparatus may be arranged horizontally or in any other convenient position.

What I claim is—

An apparatus for heating and cooling liquids, composed of a pair of oppositely-arranged communicating sinuous channels, a pair of inner communicating heating or cooling chambers intermediate said channels, a series of outer heating or cooling chambers that inclose the channels and the inner chambers, the adjoining outer heating or cooling chambers being connected alternately at the top and bottom, substantially as specified.

Signed by me at Dusseldorf, Germany, this 28th day of March, 1900.

HUBERT SEILER.

Witnesses:
WILLIAM ESSENWEIN,
V. VÖLCKERS.